United States Patent

Mann

(10) Patent No.: US 6,665,754 B2
(45) Date of Patent: Dec. 16, 2003

(54) NETWORK FOR INCREASING TRANSMIT LINK LAYER CORE SPEED

(75) Inventor: Gregory J. Mann, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 09/816,979

(22) Filed: Mar. 23, 2001

(65) Prior Publication Data

US 2002/0138674 A1 Sep. 26, 2002

(51) Int. Cl.[7] .......................... G06F 13/00; G06F 13/12
(52) U.S. Cl. .......................... 710/52; 710/60; 709/250; 709/232; 370/235
(58) Field of Search .......................... 710/20, 30, 51, 710/58, 60, 71, 72, 52; 370/351, 235, 463, 468, 470; 709/236, 234, 233, 250, 232

(56) References Cited

U.S. PATENT DOCUMENTS

| 4,593,281 A | 6/1986 | Lare |
| 4,701,913 A | 10/1987 | Nelson |
| 5,175,819 A | 12/1992 | Le Ngoc et al. |
| 5,212,686 A | * 5/1993 | Joy et al. .......................... 370/417 |
| 5,598,541 A | * 1/1997 | Malladi .......................... 710/106 |
| 5,715,248 A | 2/1998 | Lagle, III et al. |
| 5,745,684 A | * 4/1998 | Oskouy et al. .......................... 709/250 |
| 6,154,797 A | 11/2000 | Burns et al. |
| 6,459,698 B1 | * 10/2002 | Acharya .......................... 370/392 |

FOREIGN PATENT DOCUMENTS

| EP | 0 982 898 A1 | 3/2000 |
| JP | 4-61528 | 2/1992 |
| JP | 0 659 001 A2 | 6/1995 |

OTHER PUBLICATIONS

IBM Corporation, "Data Funnel For Connection of Multiple Channel Types", IBM Technical Disclosure Bulletin, vol. 32, No. 2, Jul. 1989, pp. 54–55.

* cited by examiner

*Primary Examiner*—Kim Huynh
(74) *Attorney, Agent, or Firm*—McGinn & Gibb, PLLC; Richard A. Henkler, Esq.

(57) ABSTRACT

An elastic-type first-in-first-out (FIFO) buffer network for an input/output interface to enable higher link layer clock frequencies given fixed transmit clock frequencies of these "parallel-serial" high speed link interfaces. The network is particularly applicable to interface components used in InfiniBand type hardware.

20 Claims, 5 Drawing Sheets

NETWORK FOR INCREASING TRANSMIT LINK LAYER CORE SPEED

BACKGROUND OF THE INVENTION

1. Field of the Invention

The present invention generally relates to input/output (I/O) data transmission devices, and more particularly to first-in-first-out (FIFO) buffer devices in I/O data transmission paths.

2. Description of the Related Art

InfiniBand (registered Trademark of the InfiniBand Trade Association, Portland, Oreg.) architecture is a new common I/O specification to deliver a channel based, switched-fabric technology that the entire hardware and software industry can adopt. A network and components associated with an InfiniBand network 100 are shown in FIG. 1a. InfiniBand based networks are designed to satisfy bandwidth-hungry network applications, such as those combining voice, data, and video on the Internet. InfiniBand architecture is being developed by the InfiniBand Trade Association that includes many hardware and software companies. Its robust layered design enables multiple computer systems and peripherals to work together more easily as a single high-performance and highly available server.

Being a fabric-centric, message-based architecture, InfiniBand is ideally suited for clustering, input/output extension, and native attachment in diverse network applications. InfiniBand technology can be used to build remote card cages 15 or connect to attached hosts 35, routers 40, or disk arrays 50. InfiniBand also features enhanced fault isolation, redundancy support, and built-in failover capabilities to provide high network reliability and availability. Featuring high-performance and reliability, these devices provide solutions for a range of network infrastructure components, including servers and storage area networks.

In FIG. 1b, a block diagram is shown in exemplary form of InfiniBand components in a portion of the network shown in FIG. 1a. These components have input/output interfaces, each forming part of a target channel adapter (TCA) 10, host channel adapter (HCA) 20, an interconnect switch device 30, and routers 40, each that have application specific integrated circuits (ASIC) core interfaces that include InfiniBand Technology Link Protocol Engine (IBT-LPE) cores that connect ASICs between each of these components through links 25 in an InfiniBand Technology (IBT) network 100. The IBT-LPE core supports a range of functionality that is required by all IBT devices in the upper levels of the physical layer and the lower link layer. It also handles the complete range of IBT bandwidth requirements, up to and including a 4-wide link operating at 2.5 gigabits per second. The IBT-LPE core (large integrated circuit design) in the upper levels of the physical layer and the link layer core of the ASIC comply with standards established by the InfiniBand Trade Association in the IBTA 1.0 specifications (2001). Such architectures decouple the I/O subsystem from memory by using channel based point to point connections rather than shared bus, load and store configurations.

The TCA 10 provides an interface for InfiniBand-type data storage and communication components. Creating InfiniBand adapters that leverage the performance benefits of the InfiniBand architecture is accomplished through a cooperative, coprocessing approach to the design of an InfiniBand and native I/O adapter. The TCA 10 provides a high-performance interface to the InfiniBand fabric, and the host channel communicates with a host based I/O controller using a far less complex interface consisting of queues, shared memory blocks, and doorbells. Together, the TCA and the I/O controller function as an InfiniBand I/O channel deep adapter. The TCA implements the entire mechanism required to move data between queues and to share memory on the host bus and packets on the InfiniBand network in hardware. The combination of hardware-based data movement with optimized queuing and interconnect switch priority arbitration schemes working in parallel with the host based I/O controller functions maximizes the InfiniBand adapter's performance.

The HCA 20 enables connections from a host bus to a dual 1X or 4X InfiniBand network. This allows an existing server to be connected to an InfiniBand network and communicate with other nodes on the InfiniBand fabric. The host bus to InfiniBand HCA integrates a dual InfiniBand interface adapter (physical, link and transport levels), host bus interface, direct memory target access (DMA) engine, and management support. It implements a layered memory structure in which connection-related information is stored in either channel on-device or off-device memory attached directly to the HCA. It features adapter pipeline header and data processing in both directions. Two embedded InfiniBand microprocessors and separate direct memory access (DMA) engines permit concurrent receive and transmit data-path processing.

The interconnect switch 30 can be an 8-port 4X switch that incorporates eight InfiniBand ports and a management interface. Each port can connect to another switch, the TCA 10, or the HCA 20, enabling configuration of multiple servers and peripherals that work together in a high-performance InfiniBand based network. The interconnect switch 30 integrates the physical and link layer for each port and performs filtering, mapping, queuing, and arbitration functions. It includes multicast support, as well as performance and error counters. The management interface connects to a management processor that performs configuration and control functions. The interconnect switch 30 typically can provide a maximum aggregate channel throughput of 64 gigabits, integrates buffer memory, and supports up to four data virtual lanes (VL) and one management VL per port.

FIG. 2 illustrates the core logic 210 that connects an InfiniBand transmission media 280 (the links 25 shown in FIG. 1b) to an application specific integrated circuit (ASIC) 240 (such as the TCA 10, the HCA 20, the switch 30, the router 40, etc. as shown in FIG. 1b). The core logic 210 illustrated in FIG. 2 is improved using the invention described below. The core logic 210 shown in FIG. 2 is not necessarily prior art and may not be generally known to those ordinarily skilled in the art at the time of filing of the invention. While the core logic 210 is shown as being separate from the ASIC 240 in FIG. 2, as would be known by one ordinarily skilled in the art, the core logic is generally part of the ASIC.

The receive and transmit data transmission media clock 280 may operate at a different frequency (e.g., 250 MHz +/−100 parts per million on the receive path and the core logic 210 transmit data path may operate at 250 MHz). Further, in turn, the core 210 may, operate at a different frequency compared to the ASIC 240 clock speed (e.g., 312 MHz).

To accommodate the different speeds of the data signals being handled, the core logic 210 includes a serialization portion 270 that includes serialization/deserialization units 225, 227. The structure and operation of such serialization/ deserialization units is well known to those ordinarily skilled in the art and such will not be discussed in detail herein so as not to unnecessarily obscure the salient features of the invention.

The InfiniBand transmission media 280 is made up of a large number of serial transmission lanes that form the links 25. The receive serialization/deserialization units 225 deserialize the signals from the transmission media 280 and perform sufficient conversion to reduce the frequency to one that is acceptable to the core logic 210. For example, if the serialization/deserialization receive units 225 operate to deserialize 10 bits at a time, a 10-to-1 reduction occurs that reduces the 2.5 gigabit per second speed on the transmission media 280 into a 250 MHz frequency that is acceptable to the core logic 210.

The core logic 210 also includes a frequency correction unit 260. The frequency of the signal propagating along the transmission media 280 may not always occur at this wire speed, but instead may be slightly above or below the desired frequency (e.g. by up to 100 parts per million). This inconsistency in the frequency is transferred through the serialization/deserialization units 225. The frequency correction unit 260 includes FIFO buffers 261 that buffer the signal being output by the serialization/deserialization units 225 so as to provide the signal in a uniform 250 MHz frequency to the upper link layer logic 250.

The upper link layer logic 250 includes additional FIFO buffers 251 that convert the frequency of the signal output from the frequency correction unit 260 into a frequency that is acceptable to the ASIC 240. During transmission of a signal from the ASIC 240 to the transmission media 280, the process is reversed and the upper link layer logic 250 utilizes different FIFO buffers 253. Similarly, the serialization unit 270 uses other transmission serialization/deserialization units 227. Note that no correction is required by the frequency correction unit 262 for signals that are being transmitted to the transmission media 280 because the ASIC 240 generally produces a signal that does not need to be corrected.

One disadvantage of the core logic 210 shown in FIG. 2 is the large number of buffers 251, 253, 261 that are required by the upper link layer logic 250 and the frequency correction unit 260. These buffers use substantial circuit power and reduce operational speed of data being processed through the core logic 210. Therefore, there is a need to reduce the number of buffers within the core logic 210 to reduce this power usage and increase processing speed.

SUMMARY OF THE INVENTION

In view of the foregoing problems, the present invention has been devised. It is an object of the present invention to provide a parallel-serial architecture network that includes a transmission media and at least one processor connected to the transmission media by a core. The core provides communications between the transmission media and the processor.

The core includes a logic layer connected to the processor, serial lanes connecting the logic layer to the transmission media, and receive and transmit buffers within the serial lanes. The receive buffers correct for fluctuations in the transmission media and alter the frequency of signals being processed along the serial lanes.

The invention may also include serializer/deserializers within the serial lanes. The receive buffers and the transmit buffers are preferably elastic first-in, first-out (FIFO) buffers and the receive buffers and the transmit buffers are both external to the logic layer. The transmit buffers alter a frequency of signals being transferred from the layer logic to the transmission media while the receive buffers process signals being transferred from the transmission media to the logic layer. The "processor" can be a host channel adapter, a target channel adapter, or a interconnect switch of the network.

With the invention the receive buffers perform the functions that were previously performed by FIFO buffers 251 and FIFO buffers 261 in the structure shown in FIG. 2. Thus, the invention reduces the number of buffers within the core logic 210. This decrease in the number of buffers within the core logic 210 reduces power consumption, increases processing speed and decreases the chip area (e.g., footprint) consumed by the core logic 210.

Integration of frequency correction and frequency adjustment processes into the input receive elastic FIFOs 220 also enables the upper layer logic 250 to have clock frequencies that are greater than external components connected thereto. Thus, the invention moves the clock domain conversion to a lower logic level compared to the structure shown in FIG. 2.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1A:
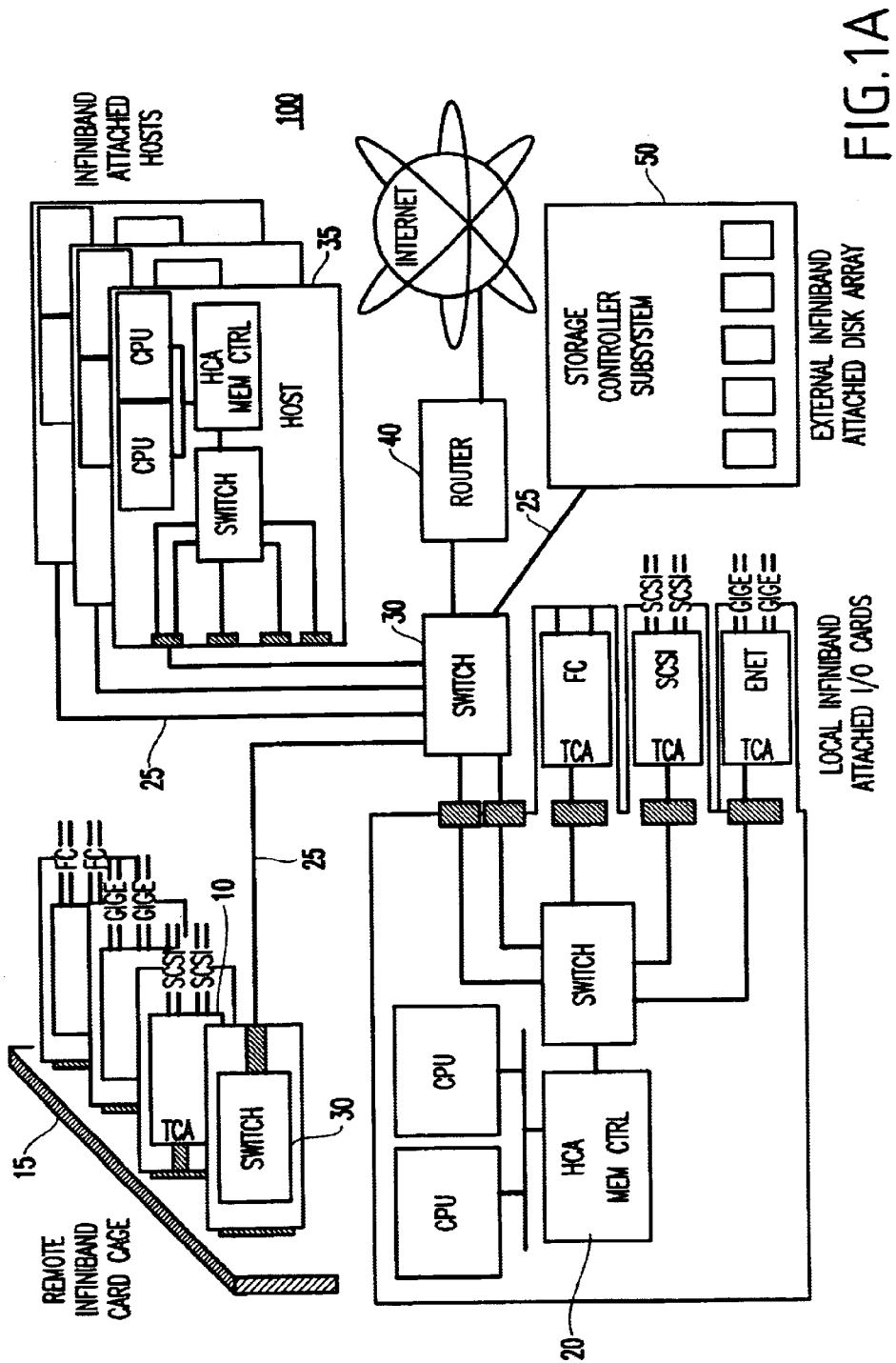
FIG. 1a is a schematic diagram of an exemplary InfiniBand network for data transmission in which the invention is preferably used.
Figure 1B:
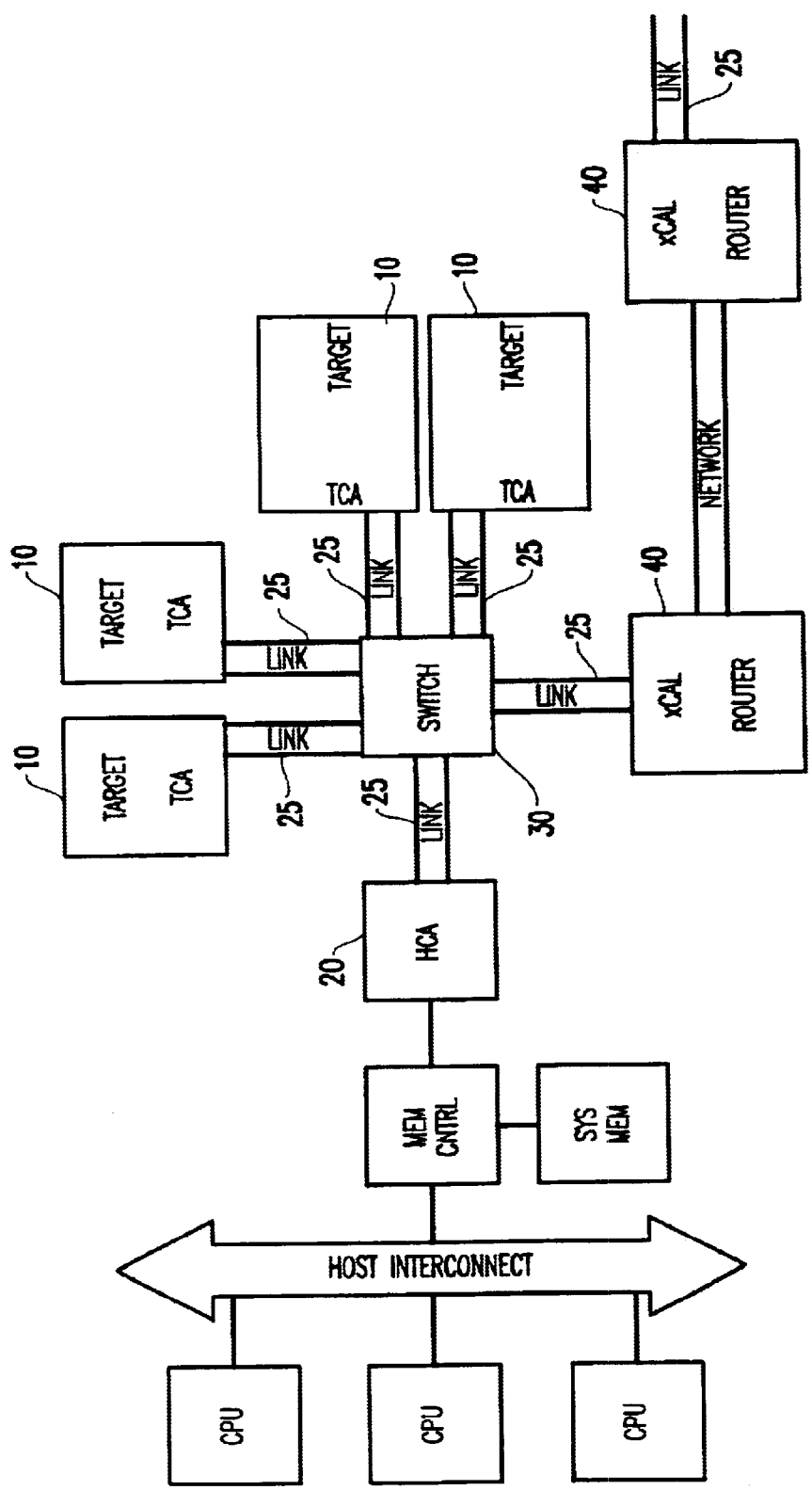
FIG. 1b is a section of the InfiniBand network with interface components.

As mentioned above, there is a need to reduce the number of buffers within the core logic 210. The first embodiment of the invention, shown in FIG. 3, reduces the number of buffers within the core 210 by combining the operation of the buffers 251, 261 and removing the buffers 251, 253 from the upper link layer logic 250. More specifically, as shown in FIG. 3, elastic buffers 220, 230 reside between the upper link layer logic 250 and the serialization portion 270. The frequency correction portion 260 (shown in FIG. 2) has been eliminated from the structure shown in FIG. 3.

The receive elastic FIFO buffers 220 now perform the function of the frequency correction portion 260 and correct any frequency deviations which may occur along the transmission media 280. However, FIFO buffers 220 also modify the frequency of the signal to that desired by the ASIC 240, which was a function that was separately performed by FIFO buffers 251 shown in FIG. 2.

Figure 2:
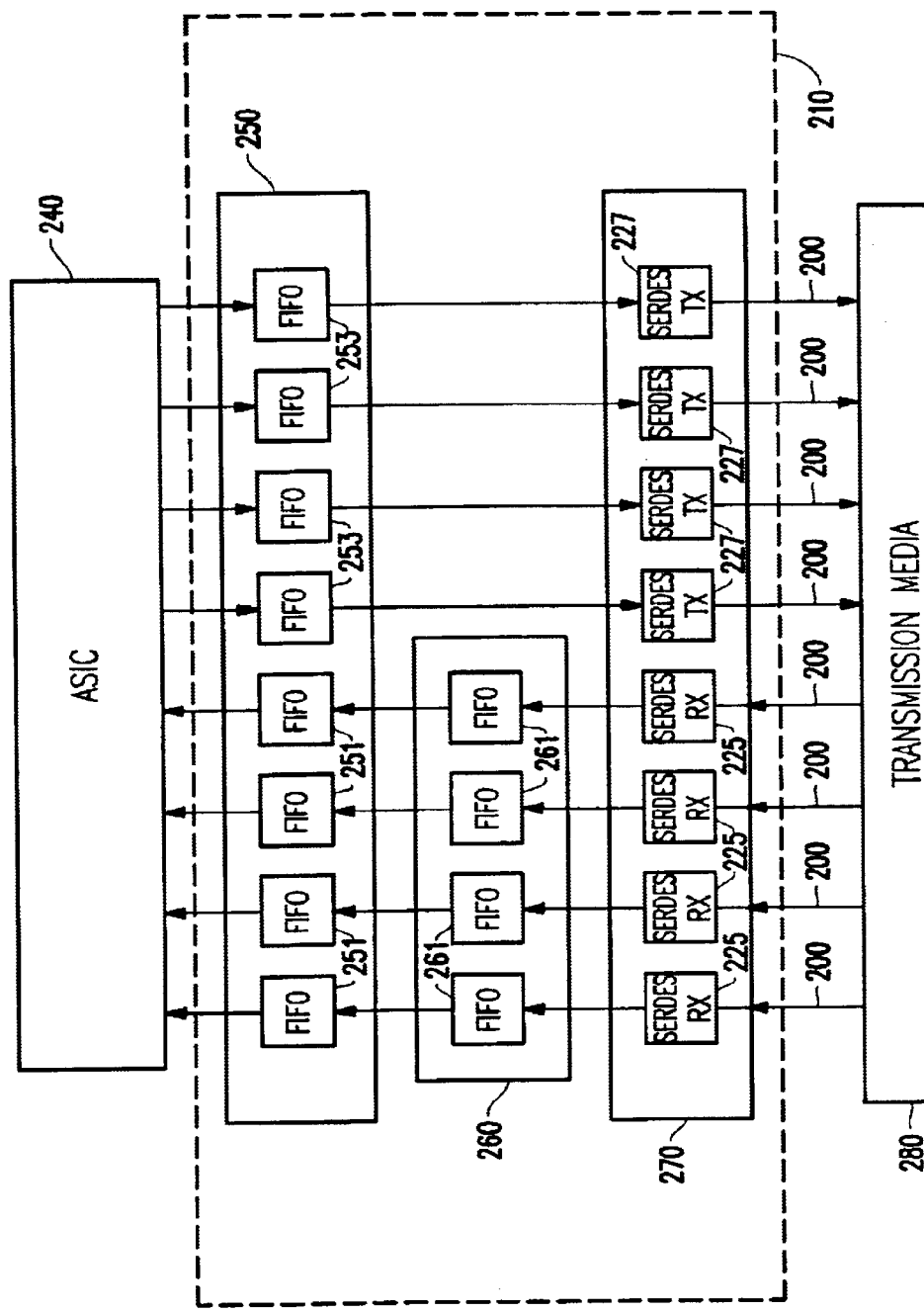
FIG. 2 is a schematic diagram of a core that provides transmission between an ASIC and a transmission media.
Figure 3:
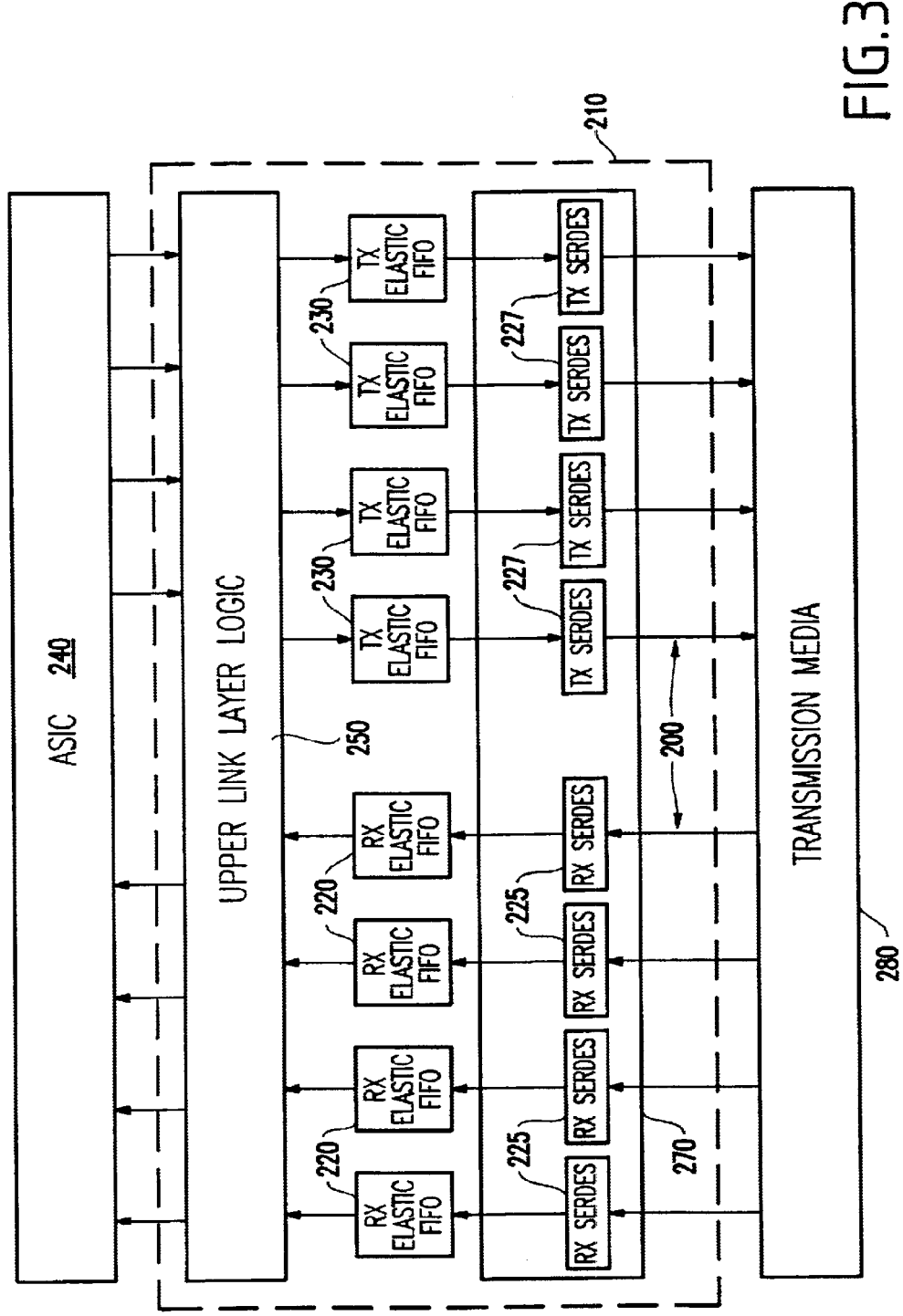
FIG. 3 is a schematic diagram of a core that provides transmission between an ASIC and a transmission media.

Therefore, the FIFO buffers 220 perform the functions that were previously performed by FIFO buffers 251 and 261 shown in FIG. 2, thereby reducing the number of buffers within the core logic 210. This decrease in the number of buffers within the core logic 210 reduces power consumption, increases processing speed and decreases the chip area consumed by the core logic 210. The elastic transmission FIFO buffers 230 perform a similar function to the transmission FIFOs 253 shown in FIG. 2.

Integration of frequency correction and frequency adjustment processes into the input receive elastic FIFOs 220 also enables the upper layer logic 250 to have clock frequencies that are greater than external components connected thereto. For example, the upper layer logic section 250 could have a speed greater than 250 MHz while the buffers 220, 230 and serialization 270 portion could operate at approximately 250 MHz (the network shown in FIG. 3 moves the clock domain conversion to a lower logic level compared to that shown in FIG. 2).

As mentioned above, some hardware in InfiniBand networks have components that operate at different speeds due to different standards imposed. For example, some devices in an InfiniBand network that operate at 250 MHz must communicate with non-InfiniBand interface components such as "Fibre Channel" based components that operate at 312 MHz. These various speed differentials are reconciled the invention. By integrating the clock-compensation FIFOs 251 that would be used to perform the clock domain conversion with the frequency correction FIFOs 251 in the inventive elastic FIFOs 220 used by the lower level receive logic section of an I/O component, the invention improves network performance by lowering the latency of the data passing through the device.

Figure 4:
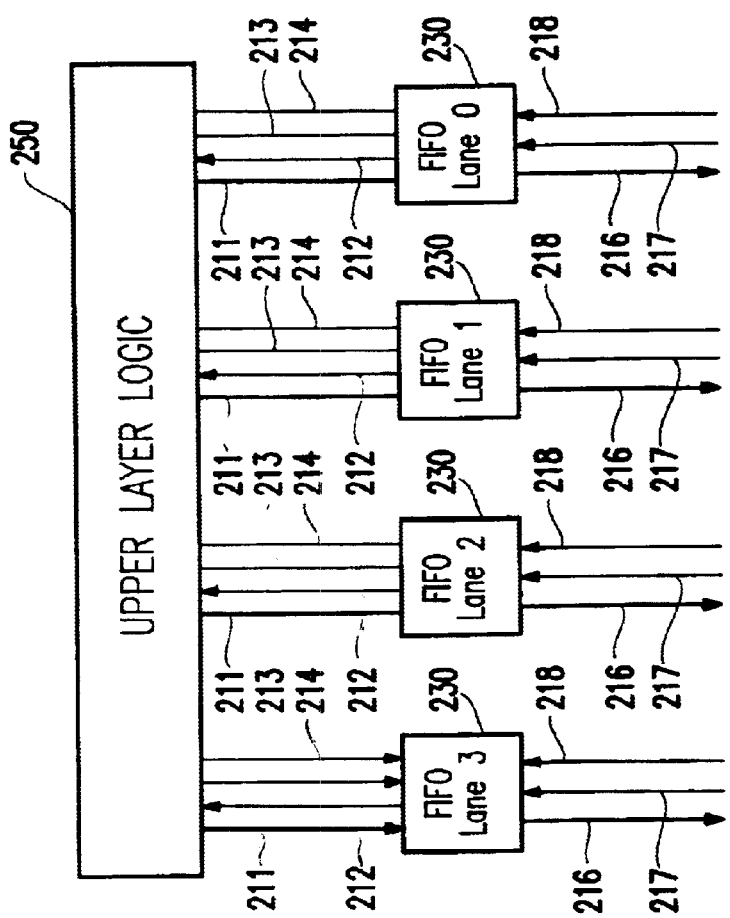
FIG. 4 is a more detailed schematic diagram of a portion of the core logic shown in FIG. 3.

Referring now to FIG. 4, a more detailed schematic of the design for the core 210 is illustrated. To enable different clock speeds between the transmit media 280 (through the parallel-serial high speed physical layer) and the upper layer logic 250, data is transmitted through byte striped serial transmit lanes 200, each through serializer/deserializer (TX SERDES) convertors 227. Logic controller circuitry for pacing the upper transmit layer logic 250 is incorporated therein to prevent FIFO overflow. The logic controller detects when the elastic FIFO buffers 220, 230 are almost full, and then interrupts the clocking of the upper layer logic 250 (pauses data flow) to prevent excessive data flow into these elastic FIFOs 220, 230 when they are almost full.

As is well known to those ordinarily skilled in the art, such elastic FIFO buffers 220, 230, each have multiple memory locations into which data is consecutively input. The elastic FIFOs are the preferred form of FIFO used in the invention because they can tolerate different amounts of data (e.g., are expandable). Alternatively, regular FIFOs (e.g. non-elastic) can be used, but with restriction since only a fixed amount of data can be contained within them at any instant in time. Data is output from FIFO's in the same consecutive order in which it is input.

As is also well known, there are controls on the input that instruct the FIFO buffers to latch the current input and place it into the next memory location, and controls on the output that instruct the FIFO buffers to present the next memory location on the output. There are also indications from the device 220, 230 on how much data is currently in the device. The frequency at which data is removed from the device is not necessarily related to the frequency of data being place into the device, which allows the FIFO to convert the frequency of signals. However, logic controlling the device must control it so as to avoid instructing the output to advance to the next entry when there is no data in the device, and avoid instructing the input to place data in the next entry when the device is full of data. To achieve the foregoing functions, the elastic FIFOs 220, 230 include connections for a data byte signal 211, a FIFO full indication 212, a data strobe signal 213 and an upper layer clock signal 214 for each of the FIFO lanes. Additionally, a data byte out signal 216, data get strobe get signal 217 and a media clock signal 218 are used for data signal transmission control.

The FIFO 230 uses each latching edge of a data_byte_out_clk signal 218 for which data_byte_get_strobe signal 217 is asserted to free an entry in the FIFO, and place the data in the entry on the output of the FIFO. The FIFO uses each latching edge of data_byte_in_clk signal 214 for which the data_byte_put_strobe signal 213 is asserted to place an entry into the FIFO. The FIFO indicates how much data is currently in the FIFO on the data_count. This value is updated as data is inserted and removed. The upper layer logic section 250 uses the data_count output to monitor the status of the FIFO. If all of the entries in the FIFO are used, the upper layer logic will reassert data_byte_put_strobe signal 213 until the data_count value indicates there is an entry available. When the above operation is used, the upper layer logic section 210 can operate at higher frequencies, and clock domain conversion is achieved.

As shown above, with the invention the FIFO buffers 220 perform the functions that were previously performed separately by FIFO buffers 251 and 261 in the structure shown in FIG. 2, thereby reducing the number of buffers within the core logic 210. This decrease in the number of buffers within the core logic 210 reduces power consumption, increase processing speed and decreases the chip area consumed by the core logic 210. Integration of frequency correction and frequency adjustment processes into the input receive elastic FIFOs 220 also enables the upper layer logic 250 to have clock frequencies that are greater than external components connected thereto (for example, the upper layer logic section 250 could have a speed greater than 250 MHz while the buffers 220, 230 and serialization 270 portion could operate at approximately 250 MHz). Thus, the invention moves the clock domain conversion to a lower logic level compared to the structure shown in FIG. 2. Moreover, although the preferred structure of the invention is shown in FIG. 3, the invention can be used exclusively as a data input or output process, as required in a specified mode of operation.

The invention also allows less precise (and less costly) clocking devices to be used with the elastic FIFOs 220, 230. More specifically, the devices within the upper link layer logic 250 require clock signals that have a very high level of accuracy. By removing the buffers 220, 230 from the upper link layer logic 250, the invention reduces the demand that the core logic 210 makes for highly accurate clock signals. By allowing less accurate clock signals to be supplied to the FIFO buffers 220, 230, the invention reduces the cost of the core logic 210 in that the invention allows the substitution of less accurate and less expensive clock signal producing devices to be used for the buffers 220, 230. To the contrary, the FIFO buffers 251, 253 shown in FIG. 2 would place a greater demand on the more expensive and more accurate clock signal producing devices.

Therefore, the invention produces a number of savings by reducing the number of FIFO buffers within the core logic 210 and also by removing the buffers from the upper link layer logic 250. The invention produces a core that has a higher processing speed, smaller footprint, and that is less expensive than previous structures.

While the invention has been described in terms of preferred embodiments, those skilled in the art will recognize that the invention can be practiced with modification within the spirit and scope of the appended claims.

What is claimed is:

1. A core for providing communications between a transmission media and a processor in a parallel-serial architecture, said core comprising:
   a logic layer;
   at least one serial lane connecting said logic layer to said transmission media; and
   at least one buffer interposed in each serial lane,
   wherein each buffer corrects for fluctuations in said transmission media and alters a frequency of signals being processed along said serial lanes.

2. The core in claim 1, further comprising a serializer/deserializer connected between said transmission media and each buffer.

3. The core in claim 1, wherein said buffer comprises elastic first-in, first-out (FIFO) buffers.

4. The core in claim 1, wherein each buffer is external to said logic layer.

5. The core in claim 1, wherein said buffer comprises a plurality of buffers and a first group of said buffers alters a frequency of signals being transferred from said logic layer to said transmission media.

6. The core in claim 5, wherein a second group of said buffers alters a frequency of signals being transferred from said transmission media to said logic layer.

7. The core in claim 1, wherein said processor is a unit selected from a group consisting of a host channel adapter, a target channel adapter, and an interconnect switch.

8. A parallel-serial architecture network comprising a transmission media and at least one processor connected to said transmission media by a core, said core providing communications between said transmission media and said processor, said core comprising:
   a logic layer;
   a plurality of serial lanes connecting said logic layer to said transmission media; and
   a plurality of receive buffers and transmit buffers within said serial lanes,
   wherein said receive buffers and said transmit buffers alter a frequency of signals being processed along said serial lanes.

9. The parallel-serial architecture network in claim 8, further comprising a plurality of serializer/deserializer within said serial lanes.

10. The parallel-serial architecture network in claim 8, wherein said receive buffers and said transmit buffers comprise elastic first-in, first-out (FIFO) buffers.

11. The parallel-serial architecture network in claim 8, wherein said receive buffers and said transmit buffers are external to said logic layer.

12. The parallel-serial architecture network in claim 8, wherein said transmit buffers alter a frequency of signals being transferred from said layer logic to said transmission media.

13. The parallel-serial architecture network in claim 8, wherein said receive buffers process signals being transferred from said transmission media to said logic layer.

14. The parallel-serial architecture network in claim 8, wherein said processor comprises one of a host channel adapter, a target channel adapter, and a interconnect switch.

15. A core for providing communications between a transmission media and a processor in a byte-stripped parallel-serial InfiniBand architecture, said core comprising:
   a logic layer;
   a plurality of serial lanes connecting said logic layer to said transmission media; and
   a plurality of receive buffers and transmit buffers within said serial lanes,
   wherein said receive buffers correct for fluctuations in said transmission media and alter a frequency of signals being processed along said serial lanes.

16. The core in claim 15, further comprising a plurality of serializer/deserializer within said serial lanes.

17. The core in claim 15, wherein said receive buffers and said transmit buffers comprise elastic first-in, first-out (FIFO) buffers.

18. The core in claim 15, wherein said receive buffers and said transmit buffers are external to said logic layer.

19. The core in claim 15, wherein said transmit buffers alter a frequency of signals being transferred from said layer logic to said transmission media.

20. The core in claim 15, wherein said receive buffers process signals being transferred from said transmission media to said logic layer.

* * * * *